(12) United States Patent
Gui et al.

(10) Patent No.: US 12,454,613 B2
(45) Date of Patent: Oct. 28, 2025

(54) BIODEGRADABLE RESIN AND FILM PREPARED THEREBY

(71) Applicant: Toray Industries, Inc., Tokyo (JP)

(72) Inventors: Zongyan Gui, Shanghai (CN); Ruxu Wang, Shanghai (CN); Ke Wang, Shanghai (CN); Takashi Arai, Shanghai (CN); Isao Manabe, Shanghai (CN)

(73) Assignee: Toray Industries, Inc., Tokyo (JP)

( * ) Notice: Subject to any disclaimer, the term of this patent is extended or adjusted under 35 U.S.C. 154(b) by 642 days.

(21) Appl. No.: 17/910,907

(22) PCT Filed: Mar. 19, 2021

(86) PCT No.: PCT/CN2021/081672
§ 371 (c)(1),
(2) Date: Sep. 12, 2022

(87) PCT Pub. No.: WO2021/185339
PCT Pub. Date: Sep. 23, 2021

(65) Prior Publication Data
US 2023/0193021 A1    Jun. 22, 2023

(30) Foreign Application Priority Data

| Mar. 19, 2020 | (CN) | 202010199536.6 |
| Mar. 19, 2020 | (CN) | 202010200049.7 |
| Nov. 18, 2020 | (CN) | 202011293825.9 |
| Nov. 18, 2020 | (CN) | 202011297029.2 |

(51) Int. Cl.
| *C08L 67/04* | (2006.01) |
| *B65D 65/40* | (2006.01) |
| *B65D 65/46* | (2006.01) |
| *C08J 5/18* | (2006.01) |
| *C08K 5/092* | (2006.01) |
| *C08K 5/1545* | (2006.01) |
| *C09J 7/29* | (2018.01) |

(52) U.S. Cl.
CPC ............. *C08L 67/04* (2013.01); *B65D 65/40* (2013.01); *B65D 65/466* (2013.01); *C08J 5/18* (2013.01); *C08K 5/092* (2013.01); *C08K 5/1545* (2013.01); *C09J 7/29* (2018.01); *C08J 2367/04* (2013.01); *C08J 2467/04* (2013.01); *C08L 2201/06* (2013.01); *C08L 2205/025* (2013.01); *C08L 2205/03* (2013.01); *C09J 2467/006* (2013.01)

(58) Field of Classification Search
CPC ......... C08L 67/04; C08K 5/092; C08K 5/145; C08J 5/18; C09J 7/29
USPC ....................................................... 523/124
See application file for complete search history.

(56) References Cited

U.S. PATENT DOCUMENTS

2016/0168375 A1\* 6/2016 Tachinami ............ C08L 33/068
523/455

FOREIGN PATENT DOCUMENTS

| CN | 101372550 A | 2/2009 |
| CN | 105602215 A | 5/2016 |
| CN | 109897352 A | 6/2019 |
| CN | 110540741 A | 12/2019 |
| CN | 110591309 A | 12/2019 |
| WO | 2004101683 A1 | 11/2004 |
| WO | 2013184822 A1 | 12/2013 |

OTHER PUBLICATIONS

International Search Report and Written Opinion for International Application No. PCT/CN2021/081672, dated Jun. 18, 2021, 8 pages.

\* cited by examiner

*Primary Examiner* — Deve V Hall
(74) *Attorney, Agent, or Firm* — Buchanan Ingersoll & Rooney PC

(57) ABSTRACT

The present invention provides a biodegradable resin having an intrinsic viscosity of 1.0 dL/g or more, and having a loss rate of intrinsic viscosity of 10% or more after treatment at 70° C. and 85% RH for 6 hr. The present invention also provides a biodegradable resin containing 70 wt % or more of polylactic acid and having a relative biodegradation rate up to 90% or more within 12 months when the degradability in home composting at 28° C. is evaluated according to the conditions specified in ASTM D5338-15. The biodegradable resin has the characteristics of fast biodegradation speed and stable storage, has good mechanical properties, optical properties and barrier properties, can be applicable to various aspects including packaging and express transportation, and will quickly biodegrade into carbon dioxide, water and other small molecules without contamination to the environment at the end of service life. The present invention also provides a biodegradable resin film using the biodegradable resin and a product thereof, and a multilayer film containing the biodegradable resin film and a product thereof.

40 Claims, No Drawings

BIODEGRADABLE RESIN AND FILM PREPARED THEREBY

CROSS REFERENCE TO RELATED APPLICATIONS

This is the U.S. National Phase application of PCT/CN2021/081672, filed Mar. 19, 2021 which claims priority to Chinese Patent Application No. 202010200049.7, filed Mar. 19, 2020, Chinese Patent Application No. 202010199536.6, filed Mar. 19, 2020, Chinese Patent Application No. 202011293825.9, filed Nov. 18, 2020, Chinese Patent Application No. 202011297029.2, filed Nov. 18, 2020, the disclosures of each of these applications being incorporated herein by reference in their entireties for all purposes.

FIELD OF THE INVENTION

The present invention relates to the field of polymer materials, and relates to a biodegradable resin and a biodegradable resin film prepared thereby.

BACKGROUND OF THE INVENTION

Plastic is an important material that has been used in various aspects of human production and lives. However, most plastics can remain in nature for a long period of time at the end of their service life, and will cause contamination without treatment.

Biodegradable plastics can be decomposed by bacteria, and the use of such materials can effectively improve the above problems. At present, the common raw materials of biodegradable plastics in the market include polylactic acid, poly(butylene adipate-co-terephthalate), polyhydroxyalkanoate, poly(butylene succinate), polyglycolic acid, polycaprolactone, polypropylene carbonate, etc. Polylactic acid is one of the most widely used biodegradable plastics due to its excellent general performance in processing and mechanical properties. However, polylactic acid, like various other resins, also has certain disadvantages when it comes to various uses. For example, the biodegradation speed of polylactic acid is very slow, especially in environments with low bacterial contents and low ambient temperatures. That is, polylactic acid can be considered as compostable when being certificated based on standard methods of industrial composing, but it is often difficult to pass the certification of standard methods such as home composting methods and soil burial methods, which means that polylactic acid will not degrade quickly under home composting conditions or after soil burial, but remains in the compost or soil for a relatively long period of time.

Polymers such as polyhydroxyalkanoate, polyglycolic acid and polycaprolactone, which can degrade quickly, are considered biodegradable under the standard methods specified by industrial composting methods, home composting methods and soil burial methods, but the processing properties and usabilities of these materials are often not as so desirable. In particular, these materials often exhibit deficiencies in processing stability, viscoelasticity, thermal properties, and other properties when being required for use as plastic films, so that it is difficult to prepare films with stable thickness and performances, especially biaxially stretched films. In addition, these materials also have deficiencies in their usabilities such as strength, barrier properties, heat resistance and heat sealability.

To this end, there is a need for a biodegradable resin with high biodegradation speed, which degrades quickly under home composting conditions and even after soil burial, will not remain in the compost or soil for a relatively long period of time, and is capable of preparing films with excellent and stable properties that are applied to fields such as food packaging.

SUMMARY OF THE INVENTION

In order to solve the above problems, the present invention according to various embodiments provides a biodegradable resin having an intrinsic viscosity of 1.0 dL/g or more, and having a loss rate of intrinsic viscosity of 10% or more after treatment at 70° C. and 85% RH for 6 hr.

The biodegradable resin is a polymer composition that is considered to have biodegradability in a general sense, and in particular refers to a polymer composition that has a relative biological decomposition rate of 90% or more within 6 months when the biodegradability is evaluated according to the conditions specified in GB/T 19277.1-2011. Wherein, the relative biological decomposition rate is the percentage of the biological decomposition rate of a specimen to the biological decomposition rate of a reference material. On the premise of being in line with the above definition, the biodegradable resin may comprise one or more of aliphatic polyester, aliphatic aromatic polyester and aliphatic polycarbonate, and further, may comprise one or more from a group consisting of polylactic acid, poly(butylene adipate-co-terephthalate), polyhydroxyalkanoate, poly(butylene succinate), polyglycolic acid, polycaprolactone, polypropylene carbonate, and a copolymer of the above polymers.

The intrinsic viscosity (IV) is measured using a Ubbelohde type viscometer at 30° C. by dissolving a sample in trichloromethane, removing insoluble materials, and then blending to obtain a 3±1 mg/mL solution. The intrinsic viscosity can be used to characterize the molecular weight of the biodegradable resin. If the intrinsic viscosity is lower than 1.0 dL/g, the resin has a low molecular weight, which may result in insufficient processing properties and usabilities such as mechanical properties and thermal properties. Therefore, typically, the biodegradable resin according to embodiments of the present invention has an intrinsic viscosity of 1.0 dL/g or more. Preferably, the biodegradable resin described in the present invention has an intrinsic viscosity of 1.2 dL/g or more.

Further, the biodegradable resin described in embodiments of the present invention has a loss rate of intrinsic viscosity of 10% or more, preferably, a loss rate of intrinsic viscosity of 18% or more, and more preferably, 25% or more, after treatment at 70° C. and 85% RH for 6 hr. Such biodegradable resin has high biodegradation speed.

Further, the biodegradable resin described in embodiments of the present invention has a loss rate of intrinsic viscosity of 10% or less, and preferably, a loss rate of intrinsic viscosity of 6% or less, after treatment at 50° C. and 85% RH for 6 hr. Although the biodegradable resin is required to have a high biodegradation speed, it is also required to maintain good usability, i.e., good storage stability, until the end of its service life. The inventor has found that the biodegradable polyester having a loss rate of intrinsic viscosity of 10% or less, preferably, a loss rate of intrinsic viscosity of 6% or less after treatment at 50° C. and 85% RH for 6 hr can provide the aforementioned storage stability.

Further, in order to increase the biodegradation speed, the biodegradable resin contains carboxyl groups having a content of $0.1 \times 10^{-4}$ mol/g or more. Preferably, it contains carboxyl groups having a content of $0.1 \times 10^{-4}$ to $10 \times 10^{-4}$ mol/g. A carboxylic acid group can be present either on the polymer in the biodegradable resin or on a small molecule or oligomer in the biodegradable resin. In the case of too few carboxylic acid groups, the biodegradation speed will not be significantly increased. Conversely, in the case of too many carboxylic acid groups, it might be difficult to meet the processing properties, usabilities such as mechanical properties and thermal properties, as well as storage stability.

Further, the biodegradable resin described in embodiments of the present invention contains 70 wt % or more of polylactic acid. The polylactic acid is one or more of homopolymers or copolymers of lactic acid. Polylactic acid can be obtained from lactic acid and other substances serving as raw materials through dehydration polycondensation, or from lactide and other substances through ring-opening polymerization. Wherein, as lactides, it is possible to enumerate cyclic dimer of L-lactic acid, i.e., L-lactide; cyclic dimer of D-lactic acid, i.e., D-lactide; meso-lactide obtained by cyclic dimerization of D-lactic acid with L-lactic acid; or a racemic mixture of D-lactide and L-lactide, i.e., DL-lactide. Any of the above lactides can be used in the present invention. For copolymers of lactic acid, their copolymerization units include a lactic acid copolymerization unit, preferably containing 85-99 mol % of L-lactic acid and/or D-lactic acid copolymerization unit; and a non-lactic acid copolymerization unit, preferably being one or more of hydroxybutyric acid, hydroxyvaleric acid, hydroxycapric acid, hydroxyoctanoic acid, glycolide and caprolactone.

The biodegradable resin containing 70 wt % or more of polylactic acid helps to improve the processing properties and the usabilities such as mechanical properties and thermal properties. Further, preferably, it contains 80 wt % or more of polylactic acid, and more preferably, contains 85 wt % or more of polylactic acid.

Further, it is preferred that the polylactic acid has a number-average molecular weight of 50,000 or more from the perspective of improving processing properties, usabilities such as mechanical properties and thermal properties, as well as storage stability. Further, the number-average molecular weight is preferably 80,000 or more.

Further, it is preferred that the polylactic acid has an optical purity of 83 to 96%, more preferably 86 to 90%, from the perspective of improving its properties such as biodegradability, processability and mechanical properties. The optical purity is the ratio of the specific rotation of a compound to the specific rotation of a standard reference substance, and for polylactic acid, it is the ratio of the specific rotation of a sample to that ($-156°$) of L-polylactic acid. The optical purity of polylactic acid can be adjusted by adjusting the contents of L-lactic acid units and D-lactic acid units that constitute polylactic acid chain segments, and more simply, by compounding two or more polylactic acids with different contents of D-lactic acid units. For example, polylactic acid with an optical purity of 978 or more and polylactic acid with an optical purity of 96% or less can be compounded in a certain weight ratio to obtain polylactic acid with a various optical purity. Preferably, the ratio of the polylactic acid with an optical purity of 978 or more to the polylactic acid with an optical purity of 96% or less is 40:60 to 90:10. The optical purity can be measured by a polarimeter with an accuracy of 18. It should be noted that the optical purity measured based on the above measurement method is marked according to an accuracy of 18, that is, the polylactic acid with an optical purity of 97% or more represents polylactic acid with an optical purity of 97%, 98% or higher measured according to the above measurement method, and the polylactic acid with the optical purity of 96% or less represents the polylactic acid with an optical purity of 96%, 95% or lower measured according to the above measurement method.

Further, it is preferred that the polylactic acid has a melting enthalpy of 10 to 58 J/g polylactic acid, further preferably, 20 to 35 J/g polylactic acid, from the perspective of improving its properties such as biodegradability, processability and mechanical properties. If the melting enthalpy of the polylactic acid is less than 10 J/g polylactic acid, the processability and mechanical properties of the polylactic acid are poor; and if the melting enthalpy of the polylactic acid is more than 42 J/g polylactic acid, the biodegradation speed is too slow.

Further, it is preferred that the biodegradable resin has a secondary heating cold crystallization temperature between 120° C. and 135° C. from the perspective of improving its properties such as biodegradability, processability and mechanical properties.

The melting enthalpy and the secondary heating cold crystallization temperature can be measured by a differential scanning calorimeter.

Further, in order to increase the biodegradation speed, the biodegradable resin comprises a compound containing at least one of carboxyl groups, anhydride groups, sulfonic acid groups, hydroxyl groups and amine groups, and having a content of 0.1 to 10 wt %; and preferably, the biodegradable resin contains 0.1 to 5 wt % of said compound. Preferably, the biodegradable resin contains 0.1 to 10 wt % of carboxylic acid and/or carboxylic anhydride, and more preferably, contains 0.1 to 5 wt % of carboxylic acid and/or carboxylic anhydride.

The carboxylic acid is an organic compound containing carboxyl groups. It is possible to enumerate monobasic acid such as acetic acid, butyric acid and stearic acid, dibasic acid such as succinic acid, adipic acid and sebacic acid, and polybasic acid such as citric acid. It is also possible to enumerate saturated carboxylic acid such as lauric acid, myristic acid and palmitic acid, and unsaturated carboxylic acid such as oleic acid, docosahexaenoic acid and maleic acid.

Carboxylic anhydride is an organic compound containing an acid-anhydride group. It is possible to enumerate saturated carboxylic anhydrides such as butanedioic anhydride, glutaric anhydride and hexanoic anhydride, and unsaturated carboxylic anhydrides such as crotonic anhydride and maleic anhydride.

Too few carboxylic acids and/or carboxylic anhydrides do not have remarkable effect on improvement of the biodegradation speed. However, too much carboxylic acids and/or carboxylic anhydrides will lead to a significant decrease in processing properties and usabilities such as mechanical properties and thermal properties as well as storage stability of the biodegradable resin.

Further, the carboxylic acid and/or carboxylic anhydride has 4 or more carbon atoms. More preferably, the carboxylic acid is one or more of succinic acid, 2-methyl-2 hydroxysuccinic acid, propylsuccinic acid, glutaric acid, 2-methyl-glutaric acid, 3-methyl-glutaric acid, adipic acid, suberic acid, azelaic acid, sebacic acid, dodecanedioic acid, galactaric acid, citric acid, cyclohexanecarboxylic acid, benzoic acid, naphthoic acid, dihydroxytartaric acid, tetramethyl succinic acid, aminovaleric acid, heptanoic acid, isoheptanoic acid, octanoic acid, aminooctanoic acid, isooctanoic acid, nonanoic acid, aminononanoic acid, capric acid, undecanoic acid, dodecanoic acid, tridecanoic acid, tetradecanoic acid, pentadecanoic acid, hexadecanoic acid, heptadecanoic acid, octadecanoic acid, nonadecanic acid, eicosic acid, behenic acid, tetracosanoic acid, hexacosanic acid, triacontanoic acid, erucic acid, linoleic acid, linolenic acid, cinnamic acid, isocinnamic acid, eleostearic acid, and ricinoleic acid; and the carboxylic anhydride is one or more of capric anhydride, salicylic anhydride, valeric anhydride, octanoic anhydride, heptanoic anhydride, succinic anhydride, glutaric anhydride, benzoic anhydride, maleic anhydride, phenoxyacetic anhydride, phthalic anhydride, polysebacic polyanhydride, and copolymers containing maleic anhydride.

The inventor has found that moderate amounts of such carboxylic acids and/or carboxylic anhydrides can significantly increase the biodegradation speed of the biodegradable resin while effectively maintaining usabilities such as processability, mechanical properties and thermal properties, as well as storage stability.

Further, the biodegradable resin contains two or more carboxylic acids, or contains one or more carboxylic acids and one or more carboxylic anhydrides. More preferably, the biodegradable resin contains sebacic acid and adipic acid, or contains sebacic acid and glutaric anhydride. The inventor has found that the combination of these carboxylic acids and/or carboxylic anhydrides is particularly favorable for improving the biodegradation speed of the biodegradable resin while being able to effectively maintain usabilities such as processing properties, mechanical properties and thermal properties, as well as storage stability.

Further, in order to increase the biodegradation speed and improve properties such as flexibility, elongation and thickness deviation of film products, it is preferred that the biodegradable resin contains one or more of aliphatic polyester, aliphatic-aromatic copolyester, aliphatic polycarbonate other than polylactic acid. Preferably, the biodegradable resin contains 5 wt % to 50 wt % of one or more of aliphatic polyester, aliphatic-aromatic copolyester, aliphatic polycarbonate other than polylactic acid. Further preferably, it contains 10 wt % to 30 wt % of one or more of aliphatic polyester, aliphatic-aromatic copolyester, aliphatic polycarbonate other than polylactic acid.

Preferably, the biodegradable resin contains 5 wt % to 50 wt % of one or more of polycaprolactone, poly(butylene succinate), poly(butylene succinate-co-adipate), poly(butylene adipate-co-terephthalate), polyhydroxyalkanoate, polypropylene carbonate, polyglycolic acid, or copolymers or derivatives of these polymers. Further preferably, it contains 10 wt % to 30 wt % of one or more of polycaprolactone, poly(butylene succinate), poly(butylene succinate-co-adipate), poly(butylene adipate-co-terephthalate), polyhydroxyalkanoate, polypropylene carbonate, polyglycolic acid, or copolymers or derivatives of these polymers.

The polycaprolactone (PCL) is a polymer containing —OCO(CH$_2$)$_5$— repeating units, typically a polymer resulting from ring-opening polymerization of caprolactone monomers. The poly(butylene succinate) (PBS) is a polymer of succinic acid and butylene glycol. The poly(butylene succinate-co-adipate) (PBSA) is a copolymer of succinic acid, adipic acid and butylene glycol. The poly(butylene adipate-co-terephthalate) (PBAT) is a copolymer of adipic acid, terephthalic acid and butylene glycol. The polyhydroxyalkanoate (PHA) is a polymer containing —O—CHR—(CH$_2$)$_m$—CO— repeating units, where R is an alkyl group and m is an integer greater than or equal to 1. It is usually a chain polyester produced by bacterial fermentation of natural sugars or lipids, for example, poly(3-hydroxybutyrate), poly(3-hydroxyvalerate), poly(3-hydroxyoctanoate), poly(3-hydroxydodecanoate) and a copolymer thereof. The polypropylene carbonate (PPC) is a polymer containing —CH$_2$CHCH$_3$OCOO— repeating units, which is usually a polymer synthesized from carbon dioxide and propylene oxide. The polyglycolic acid (PGA) is a polymer containing —CH$_2$COO— repeating units, which is typically synthesized from glycolic acid or glycolide, also known as polyhydroxyacetate or polyglycolide.

Further, in order to increase the biodegradation speed and improve mechanical properties such as flexibility, the biodegradable resin contains 50 to 500 ppm of metallic element. Further, the metallic element is one or more of sodium, magnesium, aluminum, potassium, calcium, barium, zinc, iron, copper and tin. The presence of the metallic element facilitates reactions such as ester exchange and chain expansion between the polylactic acid and other resins or additives, thereby improving compatibility.

Further, the biodegradable resin contains a dispersed phase having an average diameter of 0.5 μm to 6.0 μm.

In the biodegradable resin described in embodiments of the present invention, one or more of additives such as fillers, plasticizers, compatibilizers, capping agents, flame retardants, nucleating agents, antioxidants, lubricants, anti-static agents, anti-fogging agents, light stabilizers, ultraviolet absorbers, pigments, mildewproof agents, antimicrobial agents, or foaming agents can be used without hindering realization of the purpose of the present invention.

The fillers described can be used in the form of fibers, flakes, granules, or powders typically used in the rubber and plastic industry, including inorganic or organic fillers. As inorganic fillers, it can specifically enumerate one or more of fibrous inorganic fillers such as glass fibers, asbestos fibers, carbon fibers, graphite fibers, metal fibers, potassium titanate whiskers, aluminum borate whiskers, magnesium whiskers, silicon whiskers, wollastonite, sepiolite, asbestos, slag fibers, tobermorite, silica apatite, gypsum fibers, silica fibers, silica/alumina fibers, zirconia fibers, boron nitride fibers, silicon nitride fibers, or boron fibers, and one or more of flaky or granular inorganic fillers such as glass flakes, non-swelling mica, swelling mica, graphite, metal foils, ceramic beads, talc, clay, mica, sericite, zeolite, bentonite, vermiculite, montmorillonite, dolomite, kaolin, micropowder silicic acid, feldspar powder, potassium titanate, microfine hollow glass beads, calcium carbonate, magnesium carbonate, calcium sulfate, titanium dioxide, boehmite alumina, silicon oxide, gypsum, novaculite, dawsonite or white clay. As organic fillers, it can specifically enumerate one or more of vegetable fibers such as starch, cellulose, sisal fibers or bamboo fibers, animal fibers such as wool fibers, and organic synthetic fibers such as aromatic polyamide fibers, or aromatic polyester fibers. The above fillers can be subjected to any form of surface treatment to enhance their interfacial adhesion with the resin.

There is no particular limit to the plasticizers, and it can enumerate hydroxybenzoic acid esters such as 2-ethylhexyl hydroxybenzoate, polyol esters such as acetate esters of ethylene oxide adducts of glycerol, phthalic acid esters such as di-2-ethylhexyl phthalate, adipates such as dioctyl adipate, maleic acid esters such as dibutyl maleate, citric acid esters such as acetyl tributyl citrate, or alkyl phosphate esters such as tricresyl phosphate, tricarboxylic ester such as trioctyl trimellitate, alkyl ethers esters of polycarboxylic acids such as esters formed by succinic acid and triethylene glycol monomethyl ether, esters formed by adipic acid and diethylene glycol monomethyl ether, or esters formed by 1,3,6-hexanetricarboxylic acid and polyethylene glycol monomethyl ether, acetylated polyoxyethylene alkyl (the alkyl having a carbon number of 2 to 15) ethers such as acetylated polyoxyethylene hexyl ethers, polyethylene glycol diacetate having an addition mole number of 3-20 of ethylene oxide, polyoxyethylene-1,4-butanediol ether diacetate, polyethylene glycol, polypropylene glycol, or polyether of polyethylene glycol-polypropylene glycol copolymer, soybean oil or olive oil or other oils and fats, or copolymers of polylactic acids and the chemical structures described above. Preferably, it is one or more of dioctyl phthalate, dibutyl phthalate, butyl benzyl phthalate, dioctyl sebacate, dibutyl sebacate, tributyl citrate, triethyl citrate, acetyl triethyl citrate, acetyl tributyl citrate, glyceryl triacetate, polyethylene glycol, polypropylene glycol, polyethylene glycol-polypropylene glycol copolymer, polylactic acid-ethylene glycol copolymer, polylactic acid-propylene glycol copolymer, soybean oil or epoxidized soybean oil. The above plasticizers can be used alone, or two or more thereof can be used in combination.

The compatibilizers can be enumerated as a compound containing one or more of an epoxy functional group, an isocyanate functional group, a carbodiimide functional group, an anhydride functional group, a silane functional group, an oxazoline functional group, or a phosphite functional group, and the total number of the functional groups contained in the compound is 2 or more. Specifically, the compatibilizers can be one or more of toluene diisocyanate, diphenylmethane diisocyanate, p-xylylene diisocyanate, hexamethylene diisocyanate, isophorone diisocyanate, dicyclohexylmethane diisocyanate, lysine triisocyanate, gamma-glycidyl oxypropyl trimethoxysilane, polycarbodiimide, ethylene-acrylate-maleic anhydride terpolymer, or acrylic polymer with an epoxy functional group.

The capping agents may be enumerated as a compound containing one of an epoxy functional group, an isocyanate functional group, a carbodiimide functional group, an anhydride functional group, a silane functional group, an oxazoline functional group, or a phosphite functional group, and the total number of the functional groups contained in the compound is one.

Further, the biodegradable resin preferably has a biomass degree of 70%, further preferably more than 80%, and most preferably more than 90% from the environment-friendly perspective.

Further, it is preferred that the biodegradable resin has a relative biodegradation rate up to 90% or more within 12 months when the degradability in home composting at 28° C. is evaluated according to the conditions specified in ASTM D5338-15.

Further, it is preferred that the biodegradable resin has a relative biodegradation rate of 90% or more within 24 months when the degradability in soil is evaluated according to the conditions specified in ASTM D5988-18.

The present invention according to various embodiments also provides a biodegradable resin containing 70 wt % or more of polylactic acid and having a relative biodegradation rate up to 90% or more within 12 months when the degradability in home composting at 28° C. is evaluated according to the conditions specified in ASTM D5338-15.

Further, preferably, the biodegradable resin described in the present invention has an intrinsic viscosity of 1.0 dL/g or more, further preferably, 1.2 dL/g or more.

Further, preferably, the biodegradable resin described in the present invention has a loss rate of intrinsic viscosity of 18% or more after treatment at 70° C. and 85% RH for 6 hr.

Further, preferably, the biodegradable resin described in the present invention has a loss rate of intrinsic viscosity of 10% or less, and most preferably 6% or less after treatment at 50° C. and 85% RH for 6 hr.

Further, preferably, the biodegradable resin described in the present invention contains carboxyl groups having a content of $0.1 \times 10^{-4}$ mol/g or more, and further preferably, contains carboxyl groups having a content of $0.1 \times 10^{-4}$ mol/g to $10 \times 10^{-4}$ mol/g.

Further, preferably, the biodegradable resin described in the present invention contains polylactic acid having a content of 80 wt % or more.

Further, preferably, in the biodegradable resin described in the present invention, the polylactic acid has a number-average molecular weight of 50,000 or more.

Further, preferably, in the biodegradable resin described in the present invention, the polylactic acid has an optical purity of 83% to 96%.

Further, preferably, in the biodegradable resin described in the present invention, the polylactic acid has a melting enthalpy of 10 to 58 J/g polylactic acid, further preferably 20 to 35 J/g polylactic acid.

Further, preferably, the biodegradable resin described in the present invention has a secondary heating cold crystallization temperature between 120° C. and 135° C.

Further, preferably, the biodegradable resin comprises a compound containing at least one of carboxyl groups, anhydride groups, sulfonic acid groups, hydroxyl groups and amine groups, and having a content of 0.1 to 10 wt %.

Further, preferably, the biodegradable resin described in the present invention comprises carboxylic acid and/or carboxylic anhydride having a content of 0.1 to 10 wt %.

Further, preferably, the carboxylic acid and/or carboxylic anhydride has 4 or more carbon atoms.

Further, preferably, the carboxylic acid is one or more of succinic acid, glutaric acid, adipic acid, octanedioic acid, azelaic acid, sebacic acid, cyclohexanecarboxylic acid, benzoic acid and naphthoic acid; and the carboxylic anhydride is one or more of succinic anhydride, glutaric anhydride, benzoic anhydride, maleic anhydride, phenoxyacetic anhydride, phthalic anhydride, polysebacic polyanhydride, and copolymers containing maleic anhydride.

Further, preferably, the biodegradable resin described in the present invention contains 5 wt % to 50 wt % of one or more of polycaprolactone, poly(butylene succinate), poly (butylene succinate-co-adipate), poly(butylene adipate-co-terephthalate), polyhydroxyalkanoate, polypropylene carbonate, polyglycolic acid, or copolymers or derivatives of these polymers.

Further, preferably, the biodegradable resin described in the present invention contains 50 to 500 ppm of metallic element.

Further, the metallic element is one or more of sodium, magnesium, aluminum, potassium, calcium, barium, zinc, iron, copper and tin.

Further, preferably, the biodegradable resin described in the present invention contains a dispersed phase having an average diameter of 0.5 μm to 6.0 μm.

The present invention also provides a biodegradable resin film prepared from the biodegradable resin described above.

The biodegradable resin film can be prepared from the above biodegradable resin, which is taken as a material, by known molding methods, such as extrusion, casting, mold pressing, blow molding, calendering, uniaxial stretching and biaxial stretching, and can also be further prepared by heat treatment.

The thickness of the biodegradable resin film is not particularly limited, and generally can be 1 μm to 5 mm.

Further, in order to improve mechanical properties and production efficiency, the biodegradable resin film is oriented, i.e. at least one of MD (length direction) or TD (width direction) is oriented. The orientation can be prepared by uniaxial or biaxial stretching. During biaxial stretching, the draw ratio of the film in two directions (MD and TD) may be the same or different. In the polarization Raman spectrum of the film, there are certain specific characteristic peaks, the peak intensities of which are related to the degree of orientation of the film. For a film containing polylactic acid, peaks at 873 cm$^{-1}$ (peak value denoted by P) and 1769 cm$^{-1}$ (peak value denoted by Q) can be used as characteristic peaks to determine whether it is an oriented film by the following method: performing polarization Raman spectrum acquisition on the cross section of a sample film; obtaining P and Q in the length direction (MD) of the film, in the width direction (TD) of the film, and in the thickness direction (ZD); calculating the values of P/Q in the three directions respectively, which are denoted as $(P/Q)_{MD}$, $(P/Q)_{TD}$ and $(P/Q)_{ZD}$; then calculating the values of $(P/Q)_{MD}/(P/Q)_{ZD}$ and $(P/Q)_{TD}/(P/Q)_{ZD}$, and repeating the measurement according to the above method for five times, with taking a measuring point interval of 200 μm and an arbitrary measuring point direction each time; and finding the average value of $(P/Q)_{MD}/(P/Q)_{ZD}$ and the average value of $(P/Q)_{TD}/(P/Q)_{ZD}$, wherein if a certain average value≥1.1, the film is oriented in this direction.

Further, it is preferred that the degree of orientation of MD/ZD and/or TD/ZD is 170% or more.

In addition, for the purpose of improving printability, lamination adaptability, coating adaptability, etc., the biodegradable resin film described in embodiments of the present invention can be subjected to various surface treatments. As surface treatment methods, it can enumerate corona discharge treatment, plasma treatment, flame treatment, acid treatment, release treatment, etc.

Further, in order to improve the transparency of the biodegradable resin film, the biodegradable resin film has a total light transmittance of 90% or more, and/or a haze of 40% or less, and/or an internal haze of 8% or less. Preferably, the biodegradable resin film has a total light transmittance of 90% or more, a haze of 40% or less, and an internal haze of 20% or less. Further preferably, the total light transmittance is 90% or more, the haze is 33% or less, and the internal haze is 11% or less.

Further, the biodegradable resin film contains a dispersed phase, and the aspect ratio of the dispersed phase on the MD/ZD side and/or TD/ZD side is 1.5 or more, preferably 2.0 or more. The aspect ratio can be achieved by reasonable selection of components and film preparation conditions such as orientation (uniaxial or biaxial stretching).

Further, in order to improve the smoothness in use and to improve the synergistic effect with an evaporation layer when serving as a barrier packaging material so as to improve the barrier properties, at least one surface of the biodegradable resin film has a roughness of 0.05 to 0.5 μm.

In order to improve the smoothness, reduce the surface roughness, reduce the thickness deviation and improve the softness and elongation, preferably, the biodegradable resin described in the present invention contains 5 wt % to 50 wt % of one or more of polycaprolactone, poly(butylene succinate), poly(butylene succinate-co-adipate), poly(butylene adipate-co-terephthalate), polyhydroxyalkanoate, polypropylene carbonate, or copolymers or derivatives of these polymers. Further preferably, it contains 10 wt % to 30 wt % of one or more of polycaprolactone, poly(butylene succinate), poly(butylene succinate-co-adipate), poly(butylene adipate-co-terephthalate), polyhydroxyalkanoate, polypropylene carbonate, or copolymers or derivatives of these polymers. Further preferably, it contains 10 wt % to 30 wt % of one or more of polycaprolactone, poly(butylene succinate), poly(butylene succinate-co-adipate), poly(butylene adipate-co-terephthalate), or copolymers or derivatives of these polymers. In order to achieve the above preferred aspect ratio of the dispersed phase on the MD/ZD side and/or TD/ZD side, most preferably, the biodegradable resin contains 10 wt % to 30 wt % of polycaprolactone.

Further, in order to improve the uniformity of usabilities such as mechanical properties, the biodegradable resin film has a thickness coefficient of variation of 10% or less. The thickness coefficient of variation is the ratio of the standard deviation of the thickness to the average thickness. A thickness coefficient of variation of 10% or less of the biodegradable resin film can be achieved by reasonable selection of the components, particularly by selecting the biodegradable resin containing 10 wt % to 30 wt % of polycaprolactone.

Further, in order to improve the usability, the biodegradable resin film has a tensile strength of 60 MPa or more, an elongation at break of 20% or more, and a tensile modulus of elasticity of 4500 MPa or less. Preferably, the tensile strength is 70 MPa or more, the elongation at break is 100% or more, and the tensile modulus of elasticity is 3000 MPa or less.

Further, the biodegradable resin film has a relative biodegradation rate up to 90% or more within 12 months when the degradability in home composting at 28° C. is evaluated according to the conditions specified in ASTM D5338-15.

Further, the biodegradable resin film has a relative biodegradation rate up to 90% or more within 24 months when the degradability in soil is evaluated according to the conditions specified in ASTM D5988-18.

Further, the biodegradable resin film has an intrinsic viscosity of 1.0 dL/g or more, and has a loss rate of intrinsic viscosity of 10% or more, preferably 18% or more, after treatment at 70° C. and 85% RH for 6 hr.

Further, the biodegradable resin film has a loss rate of intrinsic viscosity of 10% or more, preferably 6% or more, after treatment at 50° C. and 85% RH for 6 hr.

The inventor has found that by performing uniaxial stretching or biaxial stretching and then treating the obtained biodegradable resin film at 120-150° C. for 0.1 to 5 min, it is very beneficial to achieving the following effect: i.e., after treatment at 70° C. and 85% RH for 6 hr, the loss rate of intrinsic viscosity is 10% or more (preferably 25% or more), and after treatment at 50° C. and 85% RH for 6 hr, the loss rate of intrinsic viscosity is 10% or less (preferably 6% or less).

The present invention also provides a multilayer film prepared from the biodegradable resin film. The multilayer film is a film having two or more layers. Since different layers can have different functions, the multilayer film can provide a wide variety of needs compared to a single-layer film.

The thickness of the multilayer film is not particularly limited, and generally can be 1 μm to 5 mm.

Further, the multilayer film described in embodiments of the present invention contains at least one of a vapor-deposited layer, a heat seal layer, an adhesive layer, and a bonding layer.

The vapor-deposited layer is formed by an evaporation material selected from at least one of the groups consisting of metal, metal oxide and silica, so that it can inhibit the permeation of moisture or gases such as oxygen and carbon dioxide in the presence of such an evaporation layer for improving the barrier properties, mechanical properties, and appearance of the substrate film.

The heat seal layer is a film layer containing a thermoplastic or thermosetting resin, and the film layer is connected to an opposing film layer by melting and solidifying under lower heating and pressurizing conditions for forming a sealing structure. The heat seal layer may or may not have the same components as the biodegradable resin film described in embodiments of the present invention.

The adhesive layer is a solid, semi-solid or liquid layered material containing an adhesive capable of being separated again more easily after bonding, such as acrylic, rubber and polyurethane adhesives, for connecting different layers of the multilayer film or for connecting the multilayer film with other articles.

The bonding layer is a solid, semi-solid or liquid layered material, which can be cured by heating or other means and differs from the above adhesive layer in that it cannot be easily separated after bonding curing, and the bonding layer contains one or more of a curing type adhesive, thermosetting resin, or thermoplastic resin, and is used to connect different layers of the multilayer film.

Further, in order to provide better barrier properties, the multilayer film described in embodiments of the present invention has a water vapor permeability of 10 g·μm/m² or less, preferably 5 g·μm/m² or less.

Further, in order to provide better barrier properties, the multilayer film described in embodiments of the present invention has an oxygen permeability of 1000 cc·μm/m² or less, preferably 500 cc·μm/m² or less.

The present invention according to an embodiment also provides a packaging material film using the biodegradable resin film described above.

The present invention according to an embodiment also provides an adhesive tape using the biodegradable resin film described above.

The present invention according to an embodiment also provides a packaging material film using the multilayer film described above.

The present invention according to an embodiment also provides an adhesive tape using the multilayer film described above.

The biodegradable resin described in embodiments of the present invention, the film and the multilayer film using the biodegradable resin, as well as the packaging material film, the adhesive tape and other products using the biodegradable resin film have the characteristics of fast biodegradation speed and stable storage, have good mechanical properties, optical properties and barrier properties, can be applicable to various aspects including packaging and express transportation, and will quickly biodegrade into carbon dioxide, water and other small molecules without contamination to the environment at the end of service life.

DETAILED DESCRIPTION OF EMBODIMENTS OF THE INVENTION

The present invention can be further understood clearly by the specific examples of the present invention and comparative examples given below, but the scope of the present invention is not thus limited to the following examples.

Materials used in Examples and Comparative Examples are as follows:

A1: polylactic acid, made by Natureworks Inc., US; specification: 4032D; number-average molecular weight: 110,000; biomass material; optical purity: 98%.

A2: polylactic acid, made by Natureworks Inc., US; specification: 4060D; number-average molecular weight: 110,000; biomass material; optical purity: 78%.

B1: sebacic acid, made by Sinopharm Chemical Reagent Co., Ltd.; specification: AR; biomass material.

B2: adipic acid, made by Sinopharm Chemical Reagent Co., Ltd.; specification: AR; non-biomass material.

B3: glutaric anhydride, made by Sinopharm Chemical Reagent Co., Ltd.; specification: AR; non-biomass material.

B4: ammonium sebacate, made by Sinopharm Chemical Reagent Co., Ltd.; specification: AR; biomass material.

C1: Polycaprolactone (PCL), made by Ingevity Corporation, US; specification: Capa 6500D; number-average mocular weight: 70,000; non-biomass material.

C2: Poly(butylene succinate) (PBS), made by China Blue Ridge Tunhe Company; specification: TH803S; number-average mocular weight: 50,000; non-biomass material.

C3: poly(3-hydroxybutyrate) (P3HB), made by Ningbo Tianan Company; specification: Y3000; biomass material.

D1: zinc stearate, made by China Aladdin Reagent Company; specification: AR; non-biomass material.

D2: calcium citrate, made by Sinopharm Chemical Reagent Co., Ltd.; specification: AR; biomass material.

E1: epoxide, made by German BASF Corperation; specification: Joncryl ADR 4468; non-biomass material.

E2: Ternary random copolymer of styrene-acrylonitrile-glycidyl methacrylate (SAG-008), made by China Fine Blend Company; specification: Fine-blend SAG-008; non-biomass material.

The raw materials and samples used in the Examples and Comparative Examples were tested according to the experimental methods described below. Unless specifically stated otherwise, the test temperature was always 23° C.

Intrinsic viscosity (IV): A sample was dissolved in trichloromethane, then insoluble materials were removed by suction filtration using a sand core funnel with a pore diameter of 2-5 μm to prepare a trichloromethane solution of which the solute content was 3±1 mg/mL, and the efflux time T of the sample solution was measured at 30° C. using an Ubbelohde type viscometer with a capillary tube diameter of 0.3-0.4 mm. In addition, the efflux time To of pure trichloromethane was tested under the same conditions. The intrinsic viscosity was calculated according to the equation below:

$$IV=[\ln(T/T o)]/c$$

Loss rate of intrinsic viscosity: A sample was placed in a PL-2J constant temperature and humidity chamber available from Espec Company for heat moisture treatment. The conditions of the heat moisture treatment were 70° C., 85% RH and 6 hr, or 50° C., 85% RH and 6 hr. The intrinsic viscosity ($IV_1$) of the sample before heat moisture treatment and the intrinsic viscosity ($IV_2$) of the sample after heat moisture treatment were tested as described above. The loss rate of intrinsic viscosity (ΔIV %) was calculated by the equation below:

$$\Delta IV\% = (IV_1 - IV_2)/IV_1 \times 100\%$$

Content of carboxyl groups: A sample with a mass of M was dissolved in trichloromethane, 2 drops of a 0.1 wt % cresol red's ethanol solution were added, and calibrated with a KOH standard solution, the molar concentration of which is N, until reaching the end point that the solution changed from yellow to brownish red and did not fade within 15 seconds, and the volume of the KOH standard solution used was recorded as V. In addition, the same volume of trichloromethane was used, 2 drops of a 0.1 wt % cresol red's ethanol solution were added, and calibrated with a KOH standard solution, the molar concentration of which is N, until reaching the end point that the solution changed from yellow to brownish red and did not fade within 15 seconds, and the volume of the KOH standard solution used was recorded as V0. The content of carboxyl groups was calculated according to the equation below:

Content of carboxyl groups=$(V-V0) \times N/M$

Number-average molecular weight: Measurements were performed for three times using a 1260 type gel permeation chromatograph (GPC) from Agilent Co., Ltd. by taking dichloromethane as a mobile phase, and then the average value was calculated.

Optical purity: Polylactic acid was extracted from the sample, measurements were performed for six times using an SAC-i type automatic polarimeter from ATAGO Company, Japan, by taking dichloromethane as a solvent, and the average value of the specific rotation of the polylactic acid in the extracted sample was calculated. The optical purity was calculated according to the equation below, wherein the specific rotation of a PLLA standard substance is $-156°$:

Optical purity=100%×average of specific rotations of the sample/specific rotation of the PLLA standard substance Biomass degree: According to the components of the sample, the parts by weight of organic matters in the components derived from a biological origin were denoted by M, and the parts by weight of organic matters in the components derived from an abiological origin were denoted by N. The biomass degree was calculated according to the equation below:

Biomass degree=$M/(M+N) \times 100\%$

Degradability in home composting: The biodegradability was evaluated at a compositing temperature of 28±2° C. under the remaining conditions that were according to the conditions specified in ASTM D5338-15. The resin having a relative biodegradation rate up to 90% or more within 12 months had degradability in home composting, denoted by ○; otherwise, the resin did not have degradability in home composting, denoted by x.

Degradability in soil: The biodegradability was evaluated according to the conditions specified in ASTM D5988-18. The resin having a relative biodegradation rate up to 90% or more within 24 months had degradability in soil, denoted by ○; otherwise, the resin did not have degradability in soil, denoted by x.

Degree of orientation: A 5 cm×5 cm sample was taken, and polarization Raman spectrum acquisition was performed on the cross section of the sample film in a polarization mode by using a Raman spectrometer from Horiba, Japan. Peaks at 873 cm$^{-1}$ (peak value denoted by P) and 1769 cm$^{-1}$ (peak value denoted by Q) were measured as characteristic peaks. P and Q in the length direction (MD) of the film, in the width direction (TD) of the film, and in the thickness direction (ZD) were obtained. The values of P/Q in the three directions were calculated respectively, which were denoted as $(P/Q)_{MD}$, $(P/Q)_{TD}$ and $(P/Q)_{ZD}$; then the values of $(P/Q)_{MD}/(P/Q)$ ZD and $(P/Q)_{TD}/(P/Q)_{ZD}$ were calculated, and the measurement was repeated according to the above method for five times, with taking a measuring point interval of 200 μm and an arbitrary measuring point direction each time; and the average value of $(P/Q)_{MD}/(P/Q)_{ZD}$ and the average value of $(P/Q)_{TD}/(P/Q)_{ZD}$ were found. The average value of $(P/Q)_{MD}/(P/Q)_{ZD}$ and the average value of $(P/Q)_{TD}/(P/Q)$ ZD were denoted as MD degree of orientation and TD degree of orientation, respectively.

Melting enthalpy of polylactic acid and secondary heating cold crystallization temperature: The temperature was raised from 0° C. to 215° C. at a rate of 10° C./min (the first temperature raising process) using a DSC Q100 type differential scanning calorimeter from TA Co., Ltd., and held at 215° C. for 3 min. The temperature was cooled down to 0° C. at a rate of 10° C./min, and held at 0° C. for 3 minutes. The temperature was raised to 215° C. at a rate of 10° C./min (the second temperature raising process), and the melting peak at a peak temperature of 130-180° C. in the second temperature raising process was measured as the melting enthalpy of polylactic acid, and the peak temperature of an exothermic peak in the second temperature raising process was used as a secondary heating cold crystallization temperature.

Average diameter d and aspect ratio of dispersed phase: The sample was dyed with RuO$_4$, and was sliced in an ultrathin manner along the direction to be observed, and the cross section was observed using a transmission electron microscopy JEOL2010(TEM) from JEOL. The resin was observed in an arbitrary direction. The observation directions of the film were the MD/ZD side and the TD/ZD side. Five photographs of the sample were taken randomly at each different location at a magnification of 5000×, and after outlining the profile of the dispersed phases with a pen, the area S of each dispersed phase and the length L of the two farthest points on the profile were calculated using the image processing software ImageJ 1.46r. Then the diameter d of each dispersed phase was calculated according to the equation below (the diameter of a circle having an area equal to that of the dispersed phase was used as this diameter d):

$$d = 2\sqrt{\frac{S}{\pi}} \qquad \text{Equation (1)}$$

wherein, the ratio of the length L of the dispersed phase to the diameter d of the dispersed phase is the aspect ratio of the dispersed phase.

Thickness and thickness coefficient of variation: Measurements were performed using a 7050 type thickness gauge from Sanyo Instruments, wherein 9 positions were selected uniformly on the sample, the thickness of each position was tested separately, and the average value was used as the thickness of the sample. The thickness coefficient of variation was calculated according to the equation below:

Thickness coefficient of variation=standard deviation of thickness/thickness×100%

Transparency: A 5 cm×5 cm sample was taken, and its haze and transmittance were measured using a haze meter HZ-V3 from SUGA, Japan, by taking D65 as a light source. A 3 cm×5 cm sample was placed in a cuvette containing 95% analytically pure ethanol, and the haze measured by using D65 as the light source was used as the internal haze.

Surface roughness: A 5 cm×5 cm sample was taken, and the arithmetic mean height Sa of the surface was measured as the surface roughness, using a non-contact surface tester VertScan-R5300 from Ryoka, Japan.

Tensile strength, elongation at break and tensile modulus of elasticity: A test piece in size of 150 mm×10 mm was made by a DUMBBELL SD-100 test piece maker. The tensile strength and elongation at break of the test piece were measured by a tensile tester AG-IS 1KN made by Shimadzu Corporation, Japan, wherein the test length was 50 mm and the tensile speed was 100 mm/min. The test was repeated 5 times.

Contents of metallic elements: The total content of metallic elements sodium, magnesium, aluminum, potassium, calcium, barium, zinc, iron, copper and tin was measured using an inductively coupled plasma emission spectrometer Icap7600 from Thermo Fisher Scientific, US.

Water vapor permeability (WVP): A sample with a thickness of T was taken, and its water vapor transmission rate (WVTR) was tested in a test environment of 38° C. and 90% RH according to the standard ASTM F1249-13, using a 3/34G model water vapor transmission rate tester from AMETEK MOCON Comany, US. The water vapor permeability was calculated according to the equation below:

WVP=$T$×WVTR

Oxygen permeability (OTP): A sample with a thickness of T was taken, and its oxygen transmission rate (OTR) was tested in a test environment of 20° C. and 0% RH according to the standard ASTM D3985-17, using a 2/22H model oxygen transmission rate tester from AMETEK MOCON Company, US. The water vapor permeability was calculated according to the equation below:

OTP=$T$×OTR

Examples 1-21 and Comparative Examples 1-4

The raw materials were subjected to mixing at 180° C. and 100 rpm for 6 min in a C4150-01 mixer produced by TOYOSEIKI, to prepare biodegradable resins containing the components as shown in Tables 1 and 2.

Subsequently, the biodegradable resin was molded at 180° C. and quenched in ice water using a MINI TEST PRESS type molding machine produced by TOYOSEIKI, so as to prepare a molded product with a thickness of 200 μm, followed by being subjected to 3×3 simultaneous biaxial stretching at 80° C. and a tensile rate of 5%/s using a KARO-IV biaxial stretching machine from Bruckner Co., Ltd., and then was thermally treated at 140° C. for 10 seconds to prepare the biodegradable resin film.

The performances of the biodegradable resins in various examples and comparative examples were tested, with the results listed in Tables 1 and 2. For the biodegradable resin films in various examples and comparative examples, the results were listed in Tables 3 and 4. Wherein, in various examples, the film had substantially the same results as the corresponding performance test results of the resin in terms of intrinsic viscosity, loss rate of intrinsic viscosity after treatment at 70° C. and 85% RH for 6 hr, loss rate of intrinsic viscosity after treatment at 50° C. and 85% RH for 6 hr, content of carboxyl groups, number-average molecular weight, optical purity, biomass degree, degradability in home composting, degradability in soil composting, melting enthalpy of polylactic acid, secondary heating cold crystallization temperature, and content of metallic elements. In various examples, the test results of the average diameter and aspect ratio of the dispersed phase on the MD/ZD side of the film were substantially equivalent to the test results on the TD/ZD side.

One or more functional layers such as an evaporation layer, a heat seal layer, an adhesive layer, and a bonding layer can be added to the biodegradable resin film described in various examples according to needs. The evaporation layer can be designed to achieve a water vapor permeability of 10 g·μm/m$^2$ or less, preferably 5 g·μm/m$^2$ or less, and an oxygen permeability of 1000 cc·μm/m$^2$ or less, preferably 500 cc·μm/m$^2$ or less.

It can be seen that the biodegradable resin described in embodiments of the present invention has the characteristics of fast biodegradation speed and stable storage, and has high biomass degree. The biodegradable resin film described in embodiments of the present invention has uniform thickness, strong mechanical property, good transparency and smooth surface.

TABLE 1

| Item | Example 1 | Example 2 | Example 3 | Example 4 | Example 5 | Example 6 | Example 7 | Example 8 |
|---|---|---|---|---|---|---|---|---|
| Component | | | | | | | | |
| A1 | 20 | 32 | 40 | 72 | 80 | 40 | 40 | 40 |
| A2 | 60 | 48 | 40 | 8 | 0 | 40 | 40 | 40 |
| B1 | 2 | 2 | 2 | 2 | 2 | 0 | 0 | 1 |
| B2 | 0 | 0 | 0 | 0 | 0 | 2 | 0 | 0 |
| B3 | 0 | 0 | 0 | 0 | 0 | 0 | 2 | 1 |
| B4 | 0 | 0 | 0 | 0 | 0 | 0 | 0 | 0 |
| C1 | 16.8 | 16.8 | 16.8 | 16.8 | 16.8 | 16.8 | 16.8 | 16.8 |
| C2 | 0 | 0 | 0 | 0 | 0 | 0 | 0 | 0 |
| C3 | 0 | 0 | 0 | 0 | 0 | 0 | 0 | 0 |
| D1 | 0.2 | 0.2 | 0.2 | 0.2 | 0.2 | 0.2 | 0.2 | 0.2 |

TABLE 1-continued

| | | | | | | | | |
|---|---|---|---|---|---|---|---|---|
| D2 | 0 | 0 | 0 | 0 | 0 | 0 | 0 | 0 |
| E1 | 1 | 1 | 1 | 1 | 1 | 1 | 1 | 1 |
| E2 | 0 | 0 | 0 | 0 | 0 | 0 | 0 | 0 |
| Performance | | | | | | | | |
| Intrinsic viscosity (dL/g) | 1.27 | 1.3 | 1.31 | 1.31 | 1.32 | 1.13 | 1.51 | 1.41 |
| Loss rate of intrinsic viscosity (%) After treatment at 70° C. and 85% RH for 6 hr | 44 | 42 | 39 | 37 | 33 | 42 | 45 | 45 |
| After treatment at 50° C. and 85% RH for 6 hr | 12 | 8 | 6 | 5 | 4 | 10 | 5 | 5 |
| Content of carboxyl group ($\times 10^{-4}$ mol/g) | 2.1 | 2.1 | 2.1 | 2.1 | 2.1 | 2.9 | 3.6 | 2.9 |
| Number-average molecular weight | 71200 | 73200 | 73800 | 73800 | 74500 | 62100 | 87100 | 80400 |
| Optical purity (%) | 83 | 86 | 88 | 96 | 98 | 88 | 88 | 88 |
| Biomass degree (%) | 82 | 82 | 82 | 82 | 82 | 80 | 80 | 81 |
| Degradability in home composting | ○ | ○ | ○ | ○ | ○ | ○ | ○ | ○ |
| Degradability in soil | ○ | ○ | ○ | ○ | ○ | ○ | ○ | ○ |
| Melting enthalpy of polylactic acid (J/g) | 15 | 23 | 29 | 52 | 58 | 29 | 30 | 30 |
| Secondary heating cold crystallization temperature (° C.) | 115 | 120 | 128 | 130 | 135 | 127 | 129 | 129 |
| Average diameter of dispersed phase (μm) | 0.5 | 0.5 | 0.5 | 0.5 | 0.5 | 0.5 | 0.5 | 0.5 |
| Content of metallic element (ppm) | 261 | 190 | 190 | 190 | 190 | 190 | 190 | 190 |

| | | Example 8 | Example 10 | Example 11 | Example 12 | Example 13 |
|---|---|---|---|---|---|---|
| Component | | | | | | |
| A1 | | 40.5 | 40.95 | 36 | 40 | 40 |
| A2 | | 40.5 | 40.95 | 36 | 40 | 40 |
| B1 | | 1 | 0.1 | 10 | 2 | 2 |
| B2 | | 0 | 0 | 0 | 0 | 0 |
| B3 | | 0 | 0 | 0 | 0 | 0 |
| B4 | | 0 | 0 | 0 | 0 | 0 |
| C1 | | 16.8 | 16.8 | 16.8 | 0 | 0 |
| C2 | | 0 | 0 | 0 | 16.8 | 0 |
| C3 | | 0 | 0 | 0 | 0 | 16.8 |
| D1 | | 0.2 | 0.2 | 0.2 | 0.2 | 0.2 |
| D2 | | 0 | 0 | 0 | 0 | 0 |
| E1 | | 1 | 1 | 1 | 1 | 1 |
| E2 | | 0 | 0 | 0 | 0 | 0 |
| Performance | | | | | | |
| Intrinsic viscosity (dL/g) | | 1.36 | 1.38 | 1.01 | 1.31 | 1.29 |
| Loss rate of intrinsic viscosity (%) | After treatment at 70° C. and 85% RH for 6 hr | 34 | 10 | 30 | 31 | 29 |
| | After treatment at 50° C. and 85% RH for 6 hr | 4 | 3 | 11 | 8 | 6 |
| Content of carboxyl group ($\times 10^{-4}$ mol/g) | | 1.1 | 0.2 | 10.1 | 2.1 | 2.1 |
| Number-average molecular weight | | 77100 | 78400 | 54500 | 73800 | 72500 |

TABLE 1-continued

|  |  |  |  |  |  |
|---|---|---|---|---|---|
| Optical purity (%) | 88 | 88 | 88 | 88 | 88 |
| Biomass degree (%) | 82 | 82 | 82 | 82 | 99 |
| Degradability in home composting | ○ | ○ | ○ | ○ | ○ |
| Degradability in soil | ○ | ○ | ○ | ○ | ○ |
| Melting enthalpy of polylactic acid (J/g) | 29 | 32 | 28 | 29 | 31 |
| Secondary heating cold crystallization temperature (° C.) | 126 | 133 | 115 | 128 | 120 |
| Average diameter of dispersed phase (μm) | 0.5 | 0.4 | 0.7 | 1.3 | 6 |
| Content of metallic element (ppm) | 190 | 190 | 190 | 190 | 190 |

TABLE 2

| Item | Example 14 | Example 15 | Example 16 | Example 17 | Example 18 | Example 19 | Example 20 | Example 21 |
|---|---|---|---|---|---|---|---|---|
| Component | | | | | | | | |
| A1 | 48.4 | 72.6 | 96.8 | 34.9 | 40 | 40.1 | 40 | 40.5 |
| A2 | 48.4 | 24.2 | 0 | 34.9 | 40 | 40.1 | 40 | 40.5 |
| B1 | 2 | 2 | 2 | 2 | 2 | 2 | 2 | 2 |
| B2 | 0 | 0 | 0 | 0 | 0 | 0 | 0 | 0 |
| B3 | 0 | 0 | 0 | 0 | 0 | 0 | 0 | 0 |
| B4 | 0 | 0 | 0 | 0 | 0 | 0 | 0 | 0 |
| C1 | 0 | 0 | 0 | 27 | 16.8 | 16.8 | 16.8 | 16.8 |
| C2 | 0 | 0 | 0 | 0 | 0 | 0 | 0 | 0 |
| C3 | 0 | 0 | 0 | 0 | 0 | 0 | 0 | 0 |
| D1 | 0.2 | 0.2 | 0.2 | 0.2 | 0 | 0 | 0.2 | 0.2 |
| D2 | 0 | 0 | 0 | 0 | 0.2 | 0 | 0 | 0 |
| E1 | 1 | 1 | 1 | 1 | 1 | 1 | 0 | 0 |
| E2 | 0 | 0 | 0 | 0 | 0 | 0 | 1 | 0 |
| Performance | | | | | | | | |
| Intrinsic viscosity (dL/g) | 1.32 | 1.34 | 1.38 | 1.3 | 1.24 | 1.17 | 1.25 | 1.1 |
| Loss rate of intrinsic viscosity (%) After treatment at 70° C. and 85% RH for 6 hr | 37 | 33 | 29 | 28 | 34 | 30 | 34 | 27 |
| After treatment at 50° C. and 85% RH for 6 hr | 8 | 6 | 5 | 3 | 8 | 9 | 8 | 11 |
| Content of carboxyl group (×10⁻⁴ mol/g) | 2.1 | 2.1 | 2.1 | 2.1 | 2.1 | 2.1 | 2.1 | 2.1 |
| Number-average molecular weight | 74500 | 75800 | 78400 | 73200 | 69200 | 64700 | 69900 | 60200 |
| Optical purity (%) | 88 | 93 | 98 | 88 | 88 | 88 | 88 | 88 |
| Biomass degree (%) | 99 | 99 | 99 | 72 | 82 | 82 | 82 | 83 |
| Degradability in home composting | ○ | ○ | ○ | ○ | ○ | ○ | ○ | ○ |
| Degradability in soil | ○ | ○ | ○ | ○ | ○ | ○ | ○ | ○ |
| Melting enthalpy of polylactic acid (J/g) | 22 | 34 | 45 | 25 | 29 | 29 | 25 | 20 |
| Secondary heating cold crystallization temperature (° C.) | 137 | 137 | 137 | 125 | 125 | 126 | 120 | 110 |

TABLE 2-continued

| | | | | | | | | |
|---|---|---|---|---|---|---|---|---|
| Average diameter of dispersed phase (μm) | — | — | — | 1 | 0.5 | 0.5 | 0.5 | 0.5 |
| Content of metallic element (ppm) | 190 | 190 | 190 | 190 | 230 | 30 | 190 | 190 |

| | | Comparative example 1 | Comparative example 2 | Comparative example 3 | Comparative example 4 |
|---|---|---|---|---|---|
| Component | | | | | |
| | A1 | 100 | 50 | 45 | 49.5 |
| | A2 | 0 | 50 | 45 | 49.5 |
| | B1 | 0 | 0 | 11 | 0 |
| | B2 | 0 | 0 | 0 | 0 |
| | B3 | 0 | 0 | 0 | 0 |
| | B4 | 0 | 0 | 0 | 1 |
| | C1 | 0 | 0 | 0 | 0 |
| | C2 | 0 | 0 | 0 | 0 |
| | C3 | 0 | 0 | 0 | 0 |
| | D1 | 0 | 0 | 0 | 0 |
| | D2 | 0 | 0 | 0 | 0 |
| | E1 | 0 | 0 | 0 | 0 |
| | E2 | 0 | 0 | 0 | 0 |
| Performance | | | | | |
| Intrinsic viscosity (dL/g) | | 1.64 | 1.62 | 0.8 | 0.9 |
| Loss rate of intrinsic viscosity (%) | After treatment at 70° C. and 85% RH for 6 hr | 4 | 9 | 15 | 18 |
| | After treatment at 50° C. and 85% RH for 6 hr | 2 | 4 | 11 | 10 |
| Content of carboxyl group ($\times 10^{-4}$ mol/g) | | 0.1 | 0.1 | 11.0 | 0.2 |
| Number-average molecular weight | | 96000 | 94600 | 41500 | 47600 |
| Optical purity (%) | | 98 | 88 | 88 | 88 |
| Biomass degree (%) | | 100 | 100 | 100 | 100 |
| Degradability in home composting | | x | x | x | x |
| Degradability in soil | | x | x | x | x |
| Melting enthalpy of polylactic acid (J/g) | | 38 | 19 | 33 | 33 |
| Secondary heating cold crystallization temperature (° C.) | | 114 | 104 | 100 | 102 |
| Average diameter of dispersed phase (μm) | | — | — | — | — |
| Content of metallic element (ppm) | | 30 | 30 | 30 | 30 |

TABLE 3

| Item | Example 1 | Example 2 | Example 3 | Example 4 | Example 5 | Example 6 | Example 7 |
|---|---|---|---|---|---|---|---|
| MD orientation degree | 2.4 | 2.3 | 2.3 | 2.4 | 2.4 | 2.5 | 2.4 |
| TD orientation degree | 2.7 | 2.4 | 2.4 | 2.3 | 2.5 | 2.5 | 2.4 |
| Thickness (μm) | 20.3 | 20.5 | 20.1 | 19.6 | 19.3 | 20.1 | 19.3 |
| Thickness coefficient of variation (%) | 12 | 11 | 7 | 7 | 6 | 7 | 7 |

TABLE 3-continued

| | | | | | | | |
|---|---|---|---|---|---|---|---|
| Average diameter of dispersed phase on MD/ZD side (μm) | 0.3 | 0.3 | 0.3 | 0.3 | 0.3 | 0.3 | 0.3 |
| Aspect ratio of dispersed phase on MD/ZD side (μm) | 2.3 | 2.4 | 2.5 | 2.3 | 2.4 | 2.2 | 2.1 |
| Light transmittance (%) | 95 | 95 | 95 | 95 | 95 | 95 | 95 |
| Haze (%) | 33 | 33 | 33 | 33 | 33 | 33 | 33 |
| Internal haze (%) | 11 | 11 | 11 | 11 | 11 | 11 | 10 |
| Surface roughness (μm) | 0.240 | 0.260 | 0.300 | 0.350 | 0.400 | 0.310 | 0.320 |
| Tensile strength (MPa) | 73 | 75 | 76 | 74 | 77 | 64 | 87 |
| Elongation at break (%) | 140 | 142 | 146 | 148 | 145 | 125 | 151 |
| Modulus of elasticity (MPa) | 2300 | 2312 | 2387 | 2445 | 2368 | 2876 | 2678 |

| Item | Example 8 | Example 8 | Example 10 | Example 11 | Example 12 | Example 13 |
|---|---|---|---|---|---|---|
| MD orientation degree | 2.4 | 2.4 | 2.4 | 2.4 | 2.4 | 2 |
| TD orientation degree | 2.4 | 2.4 | 2.4 | 2.4 | 2.3 | 2 |
| Thickness (μm) | 20.9 | 20.1 | 19.3 | 20.1 | 19.3 | 24.1 |
| Thickness coefficient of variation (%) | 7 | 7 | 8 | 15 | 15 | 30 |
| Average diameter of dispersed phase on MD/ZD side (μm) | 0.3 | 0.3 | 0.2 | 0.4 | 1.4 | 5.9 |
| Aspect ratio of dispersed phase on MD/ZD side (μm) | 2.4 | 2.5 | 2.3 | 2.4 | 1.3 | 1.2 |
| Light transmittance (%) | 95 | 95 | 95 | 94 | 95 | 90 |
| Haze (%) | 33 | 33 | 30 | 42 | 68 | 80 |
| Internal haze (%) | 10 | 10 | 9 | 15 | 24 | 29 |
| Surface roughness (μm) | 0.290 | 0.310 | 0.250 | 0.450 | 0.410 | 0.800 |
| Tensile strength (MPa) | 83 | 80 | 79 | 43 | 70 | 52 |
| Elongation at break (%) | 151 | 151 | 156 | 90 | 107 | 10 |
| Modulus of elasticity (MPa) | 2678 | 2456 | 2700 | 2400 | 2356 | 2800 |

TABLE 4

| Item | Example 14 | Example 15 | Example 16 | Example 17 | Example 18 | Example 19 | Example 20 |
|---|---|---|---|---|---|---|---|
| MD orientation degree | 2.4 | 2.4 | 2.4 | 2.4 | 2.4 | 2.2 | 2.4 |
| TD orientation degree | 2.4 | 2.4 | 2.4 | 2.4 | 2.4 | 2.5 | 2.7 |
| Thickness (μm) | 19.3 | 20.1 | 19.3 | 20.1 | 19.6 | 21.9 | 19.6 |
| Thickness coefficient of variation (%) | 18 | 20 | 22 | 4 | 7 | 7 | 8 |
| Average diameter of dispersed phase on MD/ZD side (μm) | — | — | — | 0.7 | 0.3 | 0.3 | 0.3 |

TABLE 4-continued

|  |  |  |  |  |  |  |  |
|---|---|---|---|---|---|---|---|
| Aspect ratio of dispersed phase on MD/ZD side (μm) | — | — | — | 2.7 | 2.3 | 2.4 | 2.4 |
| Light transmittance (%) | 93 | 93 | 93 | 93 | 94 | 94 | 94 |
| Haze (%) | 1 | 1 | 1 | 60 | 32 | 32 | 32 |
| Internal haze (%) | 1 | 1 | 1 | 23 | 3 | 3 | 3 |
| Surface roughness (μm) | 0.100 | 0.110 | 0.130 | 0.500 | 0.310 | 0.300 | 0.320 |
| Tensile strength (MPa) | 86 | 87 | 85 | 69 | 78 | 73 | 79 |
| Elongation at break (%) | 19 | 12 | 10 | 162 | 140 | 135 | 135 |
| Modulus of elasticity (MPa) | 3824 | 3912 | 3994 | 2000 | 2400 | 2575 | 2311 |

| Item | Example 21 | Comparative example 1 | Comparative example 2 | Comparative example 3 | Comparative example 4 |
|---|---|---|---|---|---|
| MD orientation degree | 2.4 | 2.6 | 2.5 | 2.4 | 2.5 |
| TD orientation degree | 2.7 | 2.5 | 2.4 | 2.5 | 2.6 |
| Thickness (μm) | 20.1 | 18.1 | 20.3 | 20.1 | 19.5 |
| Thickness coefficient of variation (%) | 8 | 32 | 40 | 45 | 40 |
| Average diameter of dispersed phase on MD/ZD side (μm) | 0.3 | — | — | — | — |
| Aspect ratio of dispersed phase on MD/ZD side (μm) | 2.2 | — | — | — | — |
| Light transmittance (%) | 94 | 93 | 93 | 93 | 93 |
| Haze (%) | 32 | 1 | 1 | 1 | 1 |
| Internal haze (%) | 3 | 1 | 1 | 1 | 1 |
| Surface roughness (μm) | 0.300 | 0.011 | 0.009 | 0.011 | 0.014 |
| Tensile strength (MPa) | 60 | 88 | 72 | 38 | 44 |
| Elongation at break (%) | 120 | 10 | 3 | 7 | 8 |
| Modulus of elasticity (MPa) | 2517 | 3824 | 3731 | 2500 | 2600 |

The invention claimed is:

1. A biodegradable resin, having an intrinsic viscosity of 1.0 dL/g or more, and having a loss rate of intrinsic viscosity of 10% or more after treatment at 70° C. and 85% RH for 6 hr.

2. A biodegradable resin, containing 70 wt % or more of polylactic acid and representing a relative biodegradation rate of 90% or more within 12 months when the degradability in home composting at 28° C. is evaluated according to the conditions specified in ASTM D5338-15.

3. The biodegradable resin according to claim 2, wherein the intrinsic viscosity is 1.0 dL/g or more.

4. The biodegradable resin according to claim 1, wherein the loss rate of intrinsic viscosity is 18% or more after treatment at 70° C. and 85% RH for 6 hr.

5. The biodegradable resin according to claim 1, wherein the loss rate of intrinsic viscosity is 10% or less after treatment at 50° C. and 85% RH for 6 hr.

6. The biodegradable resin according to claim 5, wherein the loss rate of intrinsic viscosity is 6% or less after treatment at 50° C. and 85% RH for 6 hr.

7. The biodegradable resin according to claim 1, containing carboxyl groups having a content of $0.1 \times 10^{-4}$ mol/g or more.

8. The biodegradable resin according to claim 7, containing carboxyl groups having a content of $0.1 \times 10^{-4}$ mol/g to $10 \times 10^{-4}$ mol/g.

9. The biodegradable resin according to claim 1, containing 70 wt % or more of polylactic acid.

10. The biodegradable resin according to claim 2, containing 80 wt % or more of polylactic acid.

11. The biodegradable resin according to claim 2, wherein the polylactic acid has a number-average molecular weight of 50,000 or more.

12. The biodegradable resin according to claim 2, wherein the polylactic acid has an optical purity of 83 to 96%.

13. The biodegradable resin according to claim 2, wherein the polylactic acid has a melting enthalpy of 10 to 58 J/g.

14. The biodegradable resin according to claim 13, wherein the polylactic acid has a melting enthalpy of 20 to 35 J/g.

15. The biodegradable resin according to claim 2, having a secondary heating cold crystallization temperature between 120° C. and 135° C.

16. The biodegradable resin according to claim 1, further comprising a compound containing at least one of carboxyl groups, anhydride groups, sulfonic acid groups, hydroxyl groups and amine groups, and having a content of 0.1 to 10 wt %.

17. The biodegradable resin according to claim 16, wherein said resin contains carboxylic acid and/or carboxylic anhydride having a content of 0.1 to 10 wt %.

18. The biodegradable resin according to claim 17, wherein the carboxylic acid and/or carboxylic anhydride has 4 or more carbon atoms.

19. The biodegradable resin according to claim 18, wherein the carboxylic acid is one or more of succinic acid, glutaric acid, adipic acid, suberic acid, azelaic acid, sebacic acid, cyclohexanecarboxylic acid, benzoic acid and naphthoic acid; and the carboxylic anhydride is one or more of succinic anhydride, glutaric anhydride, benzoic anhydride, maleic anhydride, phenoxyacetic anhydride, phthalic anhydride, polysebacic anhydride, and copolymers containing maleic anhydride.

20. The biodegradable resin according to claim 1, containing 5 wt % to 50 wt % of one or more of polycaprolactone, poly(butylene succinate), poly(butylene succinate-co-adipate), poly(butylene adipate-co-terephthalate), polyhydroxyalkanoate, polypropylene carbonate, polyglycolic acid, or copolymers or derivatives of these polymers.

21. The biodegradable resin according to claim 1, containing 50 to 500 ppm of metallic element.

22. The biodegradable resin according to claim 21, wherein the metallic element is one or more of sodium, magnesium, aluminum, potassium, calcium, barium, zinc, iron, copper and tin.

23. The biodegradable resin according to claim 1, containing a dispersed phase having an average diameter of 0.5 μm to 6.0 μm.

24. The biodegradable resin film according to claim 1, having a relative biodegradation rate up to 90% or more within 12 months when the degradability in home composting at 28° C. is evaluated according to the conditions specified in ASTM D5338-15.

25. The biodegradable resin film according to claim 1, representing a relative biodegradation rate of 90% or more within 24 months when the degradability in soil is evaluated according to the conditions specified in ASTM D5988-18.

26. A biodegradable resin film prepared from the biodegradable resin of claim 1.

27. The biodegradable resin film according to claim 26, wherein at least one of the MD or TD direction is oriented.

28. The biodegradable resin film according to claim 27, wherein the degree of orientation of MD/ZD and/or TD/ZD is 170% or more.

29. The biodegradable resin film according to claim 26, wherein the total light transmittance is 90% or more, the haze is 40% or less, and the internal haze is 8% or less.

30. The biodegradable resin film according to claim 29, wherein the haze is 10% or less, and the internal haze is 5% or less.

31. The biodegradable resin film according to claim 26, containing a dispersed phase, wherein the aspect ratio of the dispersed phase on the MD/ZD side and/or TD/ZD side is 1.5 or more.

32. The biodegradable resin film according to claim 26, wherein at least one surface thereof has a roughness of 0.05 to 0.5 μm.

33. The biodegradable resin film according to claim 26, wherein the thickness coefficient of variation is 10% or less.

34. The biodegradable resin film according to claim 26, wherein the tensile strength is 60 MPa or more, the elongation at break is 20% or more, and the tensile modulus of elasticity is 4500 MPa or less.

35. The biodegradable resin film according to claim 34, wherein the elongation at break is 100% or more, and the tensile modulus of elasticity is 3000 MPa or less.

36. A multilayer film comprising the biodegradable resin film of claim 26.

37. A packaging material film using the biodegradable resin film of claim 26.

38. An adhesive tape using the biodegradable resin film of claim 26.

39. A packaging material film using the multilayer film of claim 36.

40. An adhesive tape using the multilayer film of claim 36.

* * * * *